United States Patent [19]

Whalen, Jr.

[11] 4,067,096

[45] Jan. 10, 1978

[54] METHOD FOR MAKING A RECONSTITUTED METAL STRAND

[76] Inventor: Mark E. Whalen, Jr., 250 Ceder Ridge Drive, Apartment No. 714, Monroeville, Allegheny County, Pa. 44124

[21] Appl. No.: 631,409

[22] Filed: Nov. 12, 1975

[51] Int. Cl.² .............................................. B22F 3/16
[52] U.S. Cl. ........................................ 29/403; 29/420; 29/420.5
[58] Field of Search ................. 29/DIG. 31, 403, 420, 29/420.5; 75/211, 213, 224, 226, 214

[56] References Cited

U.S. PATENT DOCUMENTS

| | | | |
|---|---|---|---|
| 2,383,766 | 8/1945 | Brassert | 29/420 |
| 3,031,745 | 5/1962 | Dzialo | 29/403 |
| 3,626,577 | 12/1971 | Trible | 29/403 |
| 3,626,578 | 12/1971 | Price et al. | 29/403 |
| 3,740,215 | 6/1973 | Burk et al. | 29/420.5 |
| 3,744,118 | 7/1973 | Whalen et al. | 29/403 |
| 3,768,139 | 10/1973 | Whalen et al. | 29/403 |
| 3,802,932 | 4/1974 | Whalen et al. | 29/403 X |
| 3,815,224 | 6/1974 | Pickus et al. | 29/420.5 |
| 3,943,617 | 3/1976 | Whalen et al. | 29/403 |

*Primary Examiner*—E. M. Combs
*Attorney, Agent, or Firm*—Cushman, Darby & Cushman

[57] ABSTRACT

A method and an apparatus for making a reconstituted coherent metal strand from scrap metal is disclosed, the strand being severed into suitable lengths to provide an intermediate product for subsequent processing such as into bar stock. The intermediate product has at least the outer periphery thereof fully dense so as to eliminate or minimize interior oxidation. The method comprises conversion of the scrap metal to "regularized" chips or blocks which are force-fed generally vertically downwardly through a fixed aperture to define a stream of metal pieces having a minimum density of 15–30% and which stream forms a column of said chips generally supporting itself, the stream is rapidly heated by a combination of electrical inductive energy and percolating hot gases produced by the combustion of fossil fuel (the fossil fuel is burned in a controlled manner to provide a self-generated reducing atmosphere permeating said stream). The heating is controlled to achieve a high temperature in the outer peripheral zone of the stream so as to be readily influenced by pressure to achieve welding, the core of said stream is at a lower temperature effective to permit molding but offer resistance against which the outer peripheral zone may be properly welded. The outer heated zone of the stream is subjected to relatively minimal compaction forces (800–10,000 psi) at low equivalent strain rates (operationally less than 7 sec. -1 but preferably less than 4 sec. -1) a composite strand having an impervious outer shell. A variety of starting materials may be used with this process and when selected with an appropriate combination of stream temperature, compacting pressure and time dwell during heating and compaction, a selected level of chemical or physical quality in the intermediate product may be achieved.

12 Claims, 19 Drawing Figures

METHOD FOR MAKING A RECONSTITUTED METAL STRAND

BACKGROUND OF THE INVENTION

As early as 1887 (U.S. Pat. No. 361,197), the concept of consolidating scrap iron into a useful fully dense wrought product has been taught by building a strapped bundle of scrap metal, heating the bundle and then compressing such bundle by conventional rolling mill techniques. Infrequent attempts have been made since that time to improve such solid state method of scrap conversion. Some individuals have reduced the scrap to powder first (U.S. Pat. No. 1,453,057) another has initially cold-compressed the scrap metal into billet sized bodies for better heating (U.S. Pat. No. 1,491,392), while another has cold-fabricated bales directly from the scrap metal to be used as a bundle for heating and compression (see U.S. Pat. Nos. 2,211,984; 1,354,492; and 3,744,118), while still another provided precompressed planks or logs of scrap metal which were then eventually gathered into a bundle for heating and compression (see U.S. Pat. Nos. 2,100,537; and 2,457,861), yet others have containerized the scrap metal in cans or sheet metal coffins (see U.S. Pat. Nos. 3,626,578 and 3,626,577) prior to heating to improve the resulting surface finish. All of these improvements have involved the use of costly installations, particularly mammoth apparatus to achieve bundling or baling sufficiently large to undergo adequate reduction in conventional rolling mills. The techniques exhibit an ability to waste thermal units due to the type of heating employed and the concomitant exposure of the scrap metal in the porous bundle. These processes have been such as to degrade rather than enhance the quality and properties of the raw material with the result that the finished product, if one could be achieved at all, was of little commercial value. In those instances where a low quality and intermediate product is desired in comparison to commercial quality blooms or billet, the solid state methods have failed to maintain apparatus and operating costs at sufficiently reduced levels as to be attractive in comparison to conventional methods of processing steel. Moreover, such methods are not adaptable to a variety of different types of starting materials to achieve a variety of selected quality levels in the resulting product.

SUMMARY OF THE INVENTION

A primary object is to provide a solid-state method for consolidating scrap metal into an impervious clad configuration having at least a solid outer shell or encapsulation, said method being uniformly carried out at less capital and operating costs in comparison to any scrap consolidating method known heretofor.

Another object is to provide a unique solid-state scrap conversion method which is fully continuous and operates at higher through-put rates for a given volume of converted scrap.

Specific features pursuant to the above objects comprise the use of a vertically oriented scrap conditioning and compaction flow path, the starting scrap material being selected from classified ferrous sheet or fragementary material which is then regularized into dimpled chips or blocks, no greater than 3 to 5 inches, the regularized chips and blocks are vibrated and densified into a moving stream characterized by a density of up to 15-30%, the stream of chips or blocks is then molded by first rapidly heating the stream using both electrical induction energy and percolating gases resulting from the combustion of oxygen and natural gas at 45-95% stoichiometric whereby a self-generated reducing atmosphere is produced, the material is both extruded and molded by hot compaction which subjects the heated stream to minimal peripheral pressures using a graduated rocker-motion compression at low equivalent strain rates, the extrusion and molding is carried out continuously over a sufficiently long vertical zone unique to the art.

Yet still another object is to provide an apparatus for solid-state scrap conversion which insures less solid state defects resulting from processing and provides less operative malfunctioning due to inability to move material through the compacting and/or forging stations.

It is a further object of this invention to provide a converted ferrous scrap product characterized by composite density, being fully dense and impervious along at least a thin exterior margin called an encapsulate, and porous in the interior, said product being useful as a starting material for conventional bar rolling or tube mills; said product is also characterized by an ultra-low carbon content if desired.

SUMMARY OF THE DRAWINGS

FIG. 5 is an enlarged elevational diagram of an apparatus used in consolidating the scrap metal into a coherent product according to the process of FIG. 1;

FIGS. 5a, 5b and 5c are each sectional views taken respectively along lines 5a—5a, 5b—5b and 5c—5c of FIG. 5;

FIG. 16 is a schematic view of an alternative form of scrap stream material.

DETAILED DESCRIPTION

Figure 1:
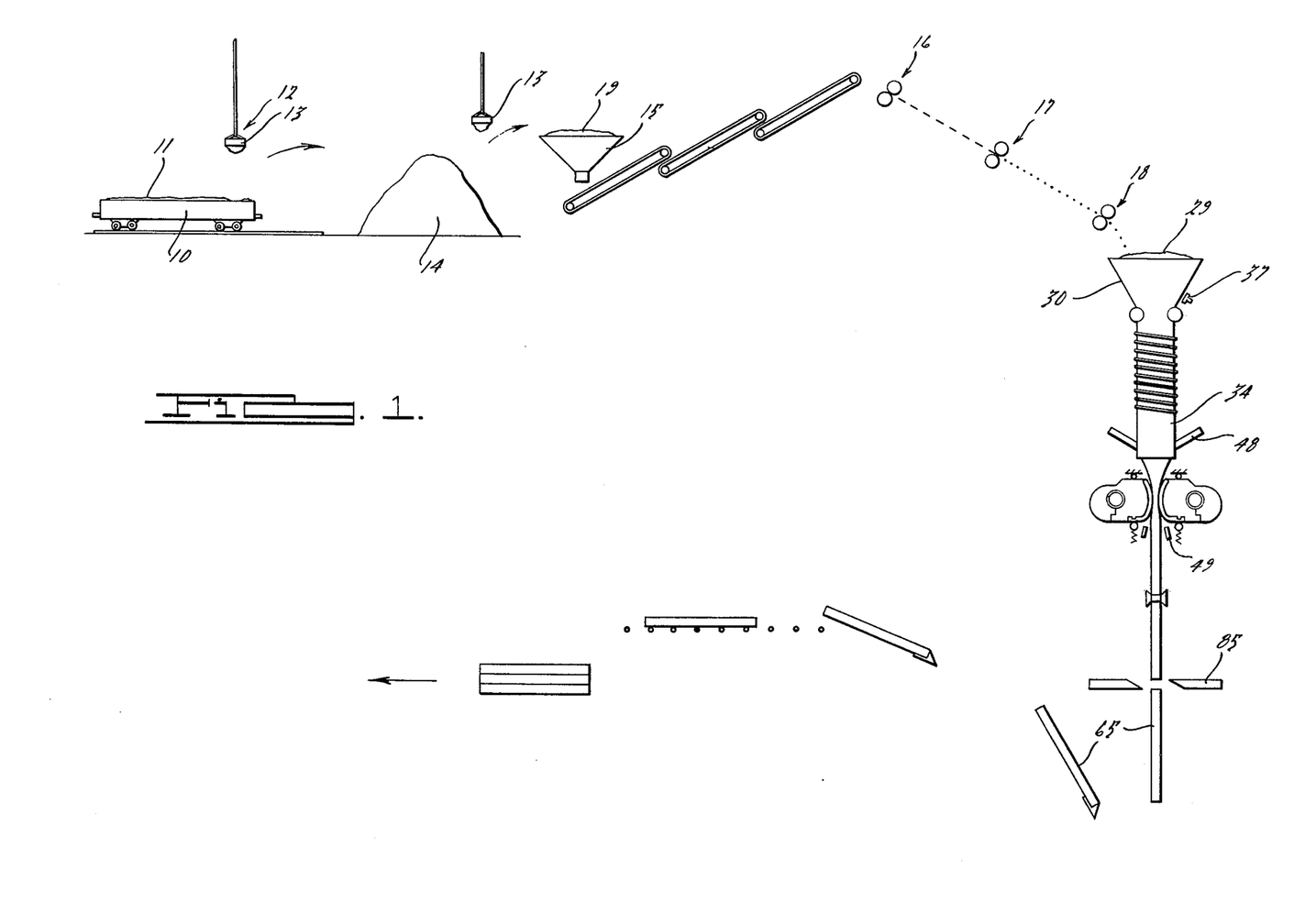
FIG. 1 is a schematic flow-diagram of one process mode for carrying out the principles of this invention.

Turning to FIG. 1, the method mode comprises essentially six steps:

1. Scrap metal collection;
2. Comminution and conditioning;

3. Forming a vibrated stream of regularized metal pieces;
4. Rapid heating and/or metallurgical reduction;
5. Hot molding and extrusion to provide an encapsulated strand;
6. Severence and end sealing.

Scrap metal collection essentially comprises collecting and transporting either classified scrap (as to chemistry and size) in railroad cars 10 as shown, or by obtaining unclassified scrap metal from a variety of sources. It is most important that the scrap metal be of a common based metal material so that the processing temperatures for heating and hot compaction are carried out at a selected design temperature associated with the particular metal characteristic. Particular use herein is made of a scrap classification known as "prompt industrial busheling" which contains scrap collected immediately from a sheet metal stamping location at a specific metal shaping plant with generally known chemistry such as low carbon steel and with a typical stock thickness up to 0.05 inches; the oxide content is substantially less than 2%. However, this is not to suggest that alloy sheet stock or steel mill croppings cannot be utilized in this process. Furthermore, the scrap classification known as "obsolete scrap" can be used herein; it contains a variety of ferrous pieces of unknown specific chemical composition along with considerable iron oxide. The thickness of the selected material plays an important role in the economy of heating of this process; the regularized chip or block should have a section thickness not unduly large to inhibit controlled atmosphere penetration of the outer zone of the stream thereof (the maximum size should typically be no greater than $4 \times 4$), nor should the section thickness be too small so that rapid heat up is inhibited without further densification (typically should not be less than $0.005 \times$ any width, which is characteristic of machine turnings).

The scrap metal starting material 11 must be available in sufficient quantities so that the process can be carried out for a minimum of one continuous hour of operation to achieve minimum cost effectiveness. Such quantities of material are transferred by conventional means such as cranes 12 carrying magnets 13 to a holding station or pile 14. In the event nonmagnetic scrap is used, other convenient transfer means can be employed.

Figures 1B, 2, 3, 4:
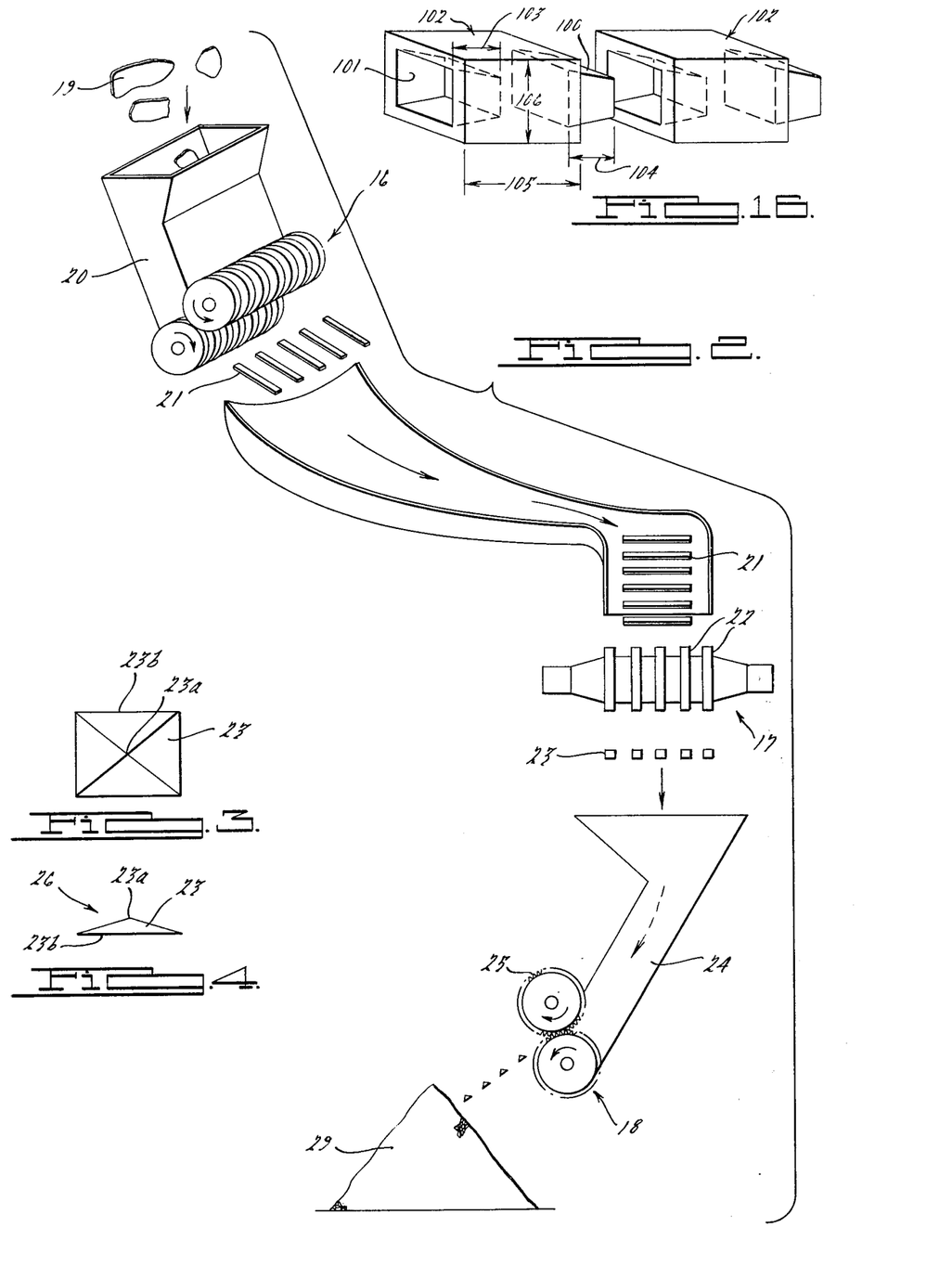
FIG. 2 is an enlarged schematic diagram of an apparatus used in conditioning the starting material for the process of FIG. 1.
FIGS. 3 and 4 are highly enlarged plan and elevation views respectively of a chip formed by the apparatus of FIG. 2.

Comminution and conditioning essentially comprises (viewing first FIG. 8 and then particularly FIGS. 2–4) transferring the raw scrap starting material from pile 14 to the top of a feeding bin 15 (by way of magnets 13) to form a collection 19; the collection 19 is transferred by conveyors to the first of tandem sets of rollers 16 and 17 acting as rotary knives. Suitable troughs may be used to carry the scrap pieces between rotary knives. Rotary knives are particularly useful with sheet metal scrap of a thickness no greater than 0.250 inch, whereby the heterogeneously shaped sheet stampings scrap pieces 19 introduced through conduit 20 may be cut into ribbons 21 of scrap metal so as to sever them into predetermined sized chips 23, preferably no greater than 3 inches, but operationally no greater than 5 inches. The chips are then arranged to fall into a collecting bin 24 which leads to and carries the chips in a flat bed through and between a third piece of apparatus 18 (such as rotary rollers each preferably having mating pre-cut cubic patterns 25 thereon) capable of imparting a dimple or distortion 26 to each chip 23 so that it is non-flat. A preferred distorted configuration is that as shown in FIGS. 3 and 4 whereby each disc or chip 23 is dimpled in the center to form a square sided pyramid, as shown in elevation in FIG. 4, having an apex 23a, a peripheral base 23b and a hollow interior. Typically for a 3 inch sided chip, the height of the apex 23a from the plane of the pyramid base will be about 1/16 inch; this optimizes density in the stream of chips to be formed.

The importance of such dimpling or distortion is recognized when it is realized that a large quantity of flat chips of a uniform size, when fed into a common channel may possess 25–45% density by close nesting but may not be relatively free-flowing under heated conditions and may tend to "hay-stack" or "bridge" causing blockages to occur in the moving chip stream. High density in the moving stream of step (3) should not be sought at the sacrifice of free flowability of the stream. With the dimpled or distorted configuration, less inner surface contact takes place between adjacent regularized chips so that a high degree of flowability of the loose chips will take place in a confined conduit and improved atmosphere penetration will take place.

The term "regularized" particles of scrap metal is used herein to mean scrap metal that has been shaped to have a predetermined maximum dimension, such as three inches, and will have a generally similar volume shape throughout most of the treated chips or blocks; substantial variance in the volume or degree of flatness is to be avoided in a "regularized" chip or block. The maximum dimension of the regularized particles (which will be typically a side of the pyramid) should be no greater than 1/2 of the smallest dimension defining the fixed aperture utilized in step 3 and should typically not be less than 1/20 of that same aperture dimension.

In instances where the process is utilized with a starting material having a thickness greater than sheet stock, straight knives can be employed to severe or chop the scrap metal into regularized blocks, as opposed to chips of metal. The blocks again should have a size configuration generally between 3–4 inches as the largest dimension thereof.

Forming vibrated stream of regularized scrap pieces comprises (and as best shown in the upper part of FIG. 5) conveying the supply 29 of regularized chips or blocks to a collecting bin 30 having a converging passage 30a; at the base of the converging passage is a fixed and predetermined aperture 32 (see also FIG. 5a) throttling and defining the stream 33 of regularized scrap pieces. Steps 3, 4 and 5 are generally arranged to be oriented in a vertical direction so that the weight of the scrap metal material facilitates movement of the stream through these particular processing steps and permits the column of chips to support itself (or at least support the more loose chips thereabove) without special conveyors other than an entraining nonmagnetic conduit or passage 34. The loose regularized chips, by their own weight and configuration will tend to be free flowing and fall through the aperture to build up a stream or column of such chips or blocks to the extent that they are not hindered from further downward vertical movement (such as by a starter block imposed initially within the compacting mill of step 5 or by the encapsulated strand supporting the column thereabove).

Figures 5, 5A, 5C:
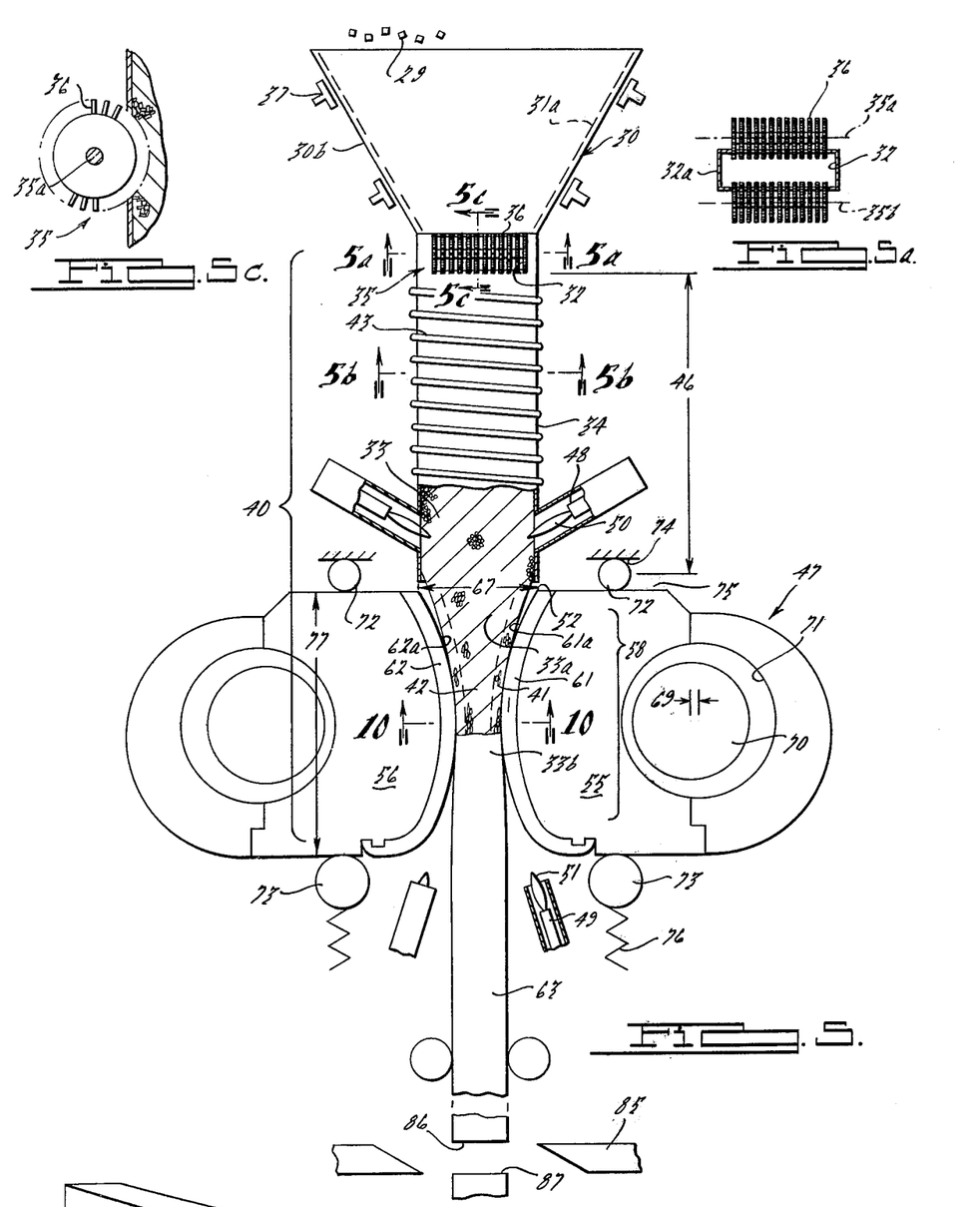

The stream forming apparatus includes a pair of breaker rolls 35 or wheels disposed along the longest dimension immediately above the cross-section of the aperture 32 and are mounted for movement about axes 35a and 35b respectively; thus the chips will tend to be more homogeneously and randomnly distributed in the stream of chips flowing downstream therefrom. The breaker or positive feeder rolls tend to prevent haystacking in the stream 33 to be formed of chips downstream therefrom, the haystacking resulting from chips interlocking. The rolls 35 protrude through an opening in the walls of the bin 30; suitable seals are arranged to close any space between the breaker rolls and the opening to confine the chips to the interior and thus to the influence of the breaker rolls.

The chips must pass through and between the rolls 35 and the spacing therebetween is arranged to allow fingers 36 of the rolls 35 to assist in feeding the chips along their path as well as break up conglomerations. To accomplish this, the diameter of the circle formed by the finger extremities may be about 11 inches and the smallest spacing between fingers of opposed rolls may be about 4 inches. The fingers may be cylindrical rods having a diameter of about ¼ inch at their ends and the spacing between adjacent fingers being about 1 inch. The fingers can also be configured as pointed lobes defined on a drum; the fingers should be rigid enough to impact movement to the collection of chips as the breaker rolls turn.

The aperture 32 is preferably defined to have a rectangular configuration with the shortest side 32a of said rectangle approximating the diagonal or longest dimension of the resulting product. This is necessary to achieve proper heating in step 4 and facilitates use of V-shaped plattens operating movably and reciprocally within a molding slot or channel (to be described). Such outer aperture is preferably arranged so that with subsequent reduction for encapsulation, the resulting intermediate or end product will be in a condition suitable for introduction to a conventional bar rolling or tube mill.

Vibrator elements 37 are arranged along the converging walls 30b of the bin 30 and are actuated to be vibrated by suitable means which will transmit vibration by contact with walls 30b and in turn vibrate chips in the bin 30 so as to assume a more densified condition as they move into stream 33. The vibrated density, with the chip or block size recommended herein, will be increased from 10–15% to 15–25% of solid. To facilitate vibrated compaction walls 30b should be of metal and have a thickness about ¼ inch and be unreinforced except at spaced locations of about 2 feet.

Rapid heating and/or metallurgical reduction comprises controlling the speed of movement of said stream of metal pieces through a heating region 40, the heating zone imparting differential heating: electrical inductive energy preferably to the outer peripheral zone 41 of said stream and perculating hot gases to permeate upwardly through the stream preferably through the core 42 thereof to heat the interior while providing a highly reducing and protective atmosphere control interiorly of said stream. Heating is carried out to achieve a design temperature in the outer peripheral margin or zone 41 of said stream and a companion design temperature for the core 42 of said stream. The design temperature for the peripheral zone 41 and for the core zone 42 will depend upon the chemistry of the material as related to its yield strength at the specific temperature under which hot extrusion or compaction is to take place.

In keeping with the low capital cost object of this invention, the design temperature for the outer peripheral margin or zone 41 should be such that the compacting or extruding forces applied to that peripheral margin should be less than 7,500 psi and yet achieve complete and homogeneous densification of said outer zone.

The specific process will correlate most closely with tensile strength of the specific steel. The latter is corroborated specifically by Lloyd Rader in the "Materials of Construction", fifth edition, (1947), wherein it is indicated that ductile steels are relatively impossible to analyze for determining their ultimate compressive strength but that such compressive strength is closely allied with the tensile strength of such ductile steel. It is known by such conventional works as "Making, Shaping and Treating of Steel", seventh edition (1947) that the tensile strength of steel will drop significantly at elevated temperatures. For example, at 1400°, the tensile strength of aluminum killed steel containing 0.1–0.2 carbon will be about 9,000 psi; at 1600°, such tensile strength will drop to 3500 psi and at 1800–2000° F, the tensile strength drops to as low as 2500 psi. It has been found that the actual compressive strength will be slightly lower than the tensile strength; thus an appropriate design temperature for any carbon steel in accordance with this invention will be in the range of 1600°–2000° F utilizing compressive or compacting forces between 800–1500 psi.

It has been further found according to this invention that the core temperature for said stream of metal chips should be at a specific design ratio with respect to the outer peripheral zone to facilitate the concept of achieving encapsulation herein. For example, if the design temperature for the outer peripheral zone is to be 1800° F, the core temperature should be about 1400° F or at approximately 75% of the temperature of the outer peripheral region. It is well recognized that there will not be a specific demarcation between such temperature zones 41 and 42 but rather there will be a temperature gradient. However, such ratio is with respect to the coldest zone.

In addition to the desire to achieve a differential temperature condition at a specific ratio within the stream of scrap metal chips, the heating rate must be relatively rapid to avoid metallurgical problems such as nitrogen embrittlement and magnanese oxide surface precipitation. This primarily results from contamination of the heated material by exposure to nitrogen and/or air at elevated temperatures for long periods of time. This can be avoided by a heat-up period of at least under 90 minutes. The time period within which such metallurgical problems can be preferably avoided should be approximately 40–50 minutes allowing for heating a preheated stream of metallic chips to a minimum temperature of 1600° F at its surface.

A third object imposed upon the desires of heating within this invention, is to provide for a highly reducing atmosphere throughout the stream of scrap metal pieces so that the metal is protected against oxidation and furthermore may be decarburized to form a steel or ferrous material which is more readily amenable to plastic deformation at reduced temperature levels.

To achieve this triology of goals under the heating step, this invention uses a combination of electrical inductive heating as well as heating by percolating combustion products from the burning of fossil fuel with oxygen. With reference first to the use of inductive heating, the concept of achieving a very rapid heat-up rate within the outer peripheral zone of the stream and achieving simultaneously condition maximum temperature can be realized. Inductive heating is limited in penetration; thus, the outer zone 41 within which such very rapid and elevated temperatures are to be achieved is well suited to the objects of this invention.

Figures 7, 8:
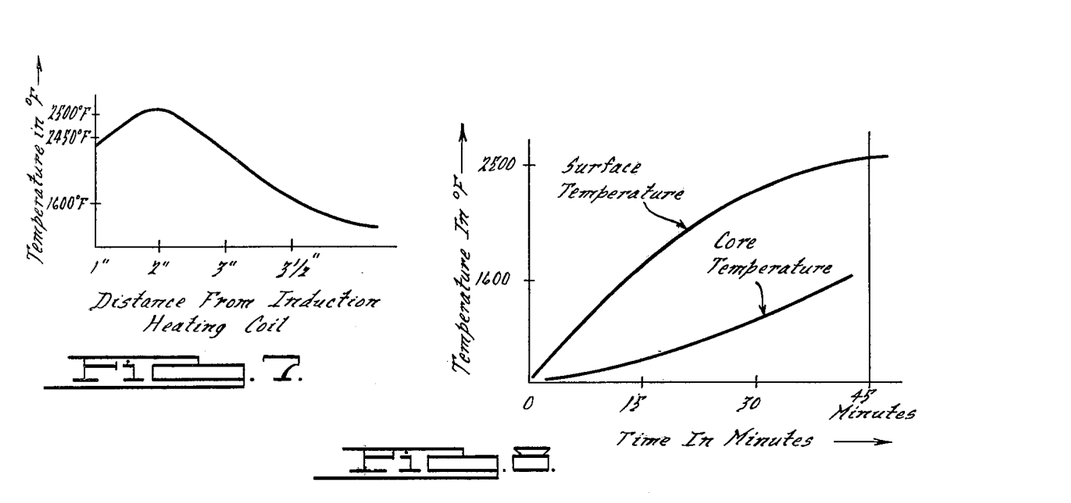
FIGS. 7 and 8 are graphical illustrations respectively depicting degrees of heating as a function of heat penetration into the thickness of the stream of scrap pieces, and depicting the degree of heating as a function of time dwell within the heating zone.
Figure 9:
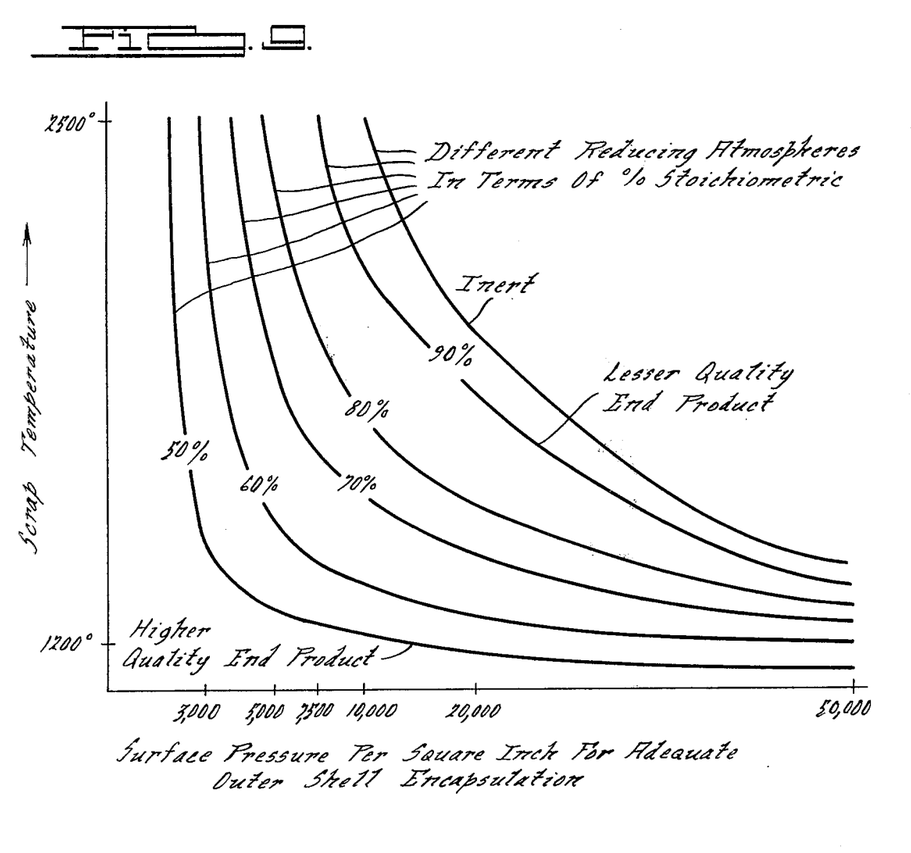
FIG. 9 is a graphical illustration depicting a variety of quality conditions for different scrap temperature versus scrap consolidating pressure relationships, thus achieving different levels of quality in the final product.
Figure 9B:
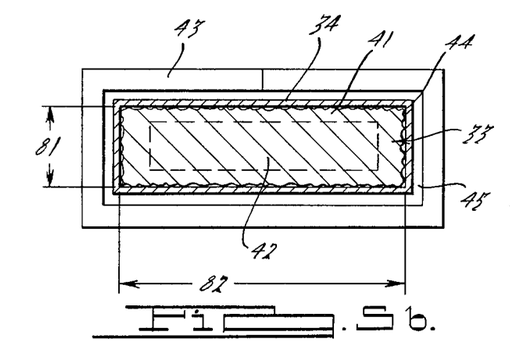

The fundamental concept of induction heating is simple in that a coil of wire is wound around a cylindrical load and energized with an alternating current; the induced current will follow the load. The distribution of this current through the load cross-section is not uniform but diminshes in magnitude toward the center. This current distribution is sometimes referred to as skin effect. For loads of large dimensions, the electrical density is equal to a depth over which the current may be assumed uniformly distributed; the depth of the induced current depends on several factors, such as the load dimension, its electrical resistivity, its magnetic permeability and the frequency of the alternating current. For example, the physical properties of carbon steel varies widely with temperature, as does the depth of penetration. Below Curie, at approximately 1350° F using 60 cycles, a depth of penetration will be approximately a little over one inch, while above Curie the penetration will average about three inches. Typical variance of inductive heating penetration with selected design temperature for the peripheral zone is shown in FIG. 7. The difference between the core temperature and surface temperature for selected design temperatures is shown in FIG. 8 for various periods of inductive heating. About 87% of the heat generated as a result of electrical conductive heating is within this depth of penetration. Heat will flow eventually to the core of the stream following ordinary laws of thermal conductivity but at an increased time dwell. Heat-up periods are must shorter with inductive heating than with fuel fired furnaces. A typical power circuit for such inductive heating for this invention would consist of a high voltage incoming line rated at a 120 kv; a main power transformer would be stepped down to the induction coil voltage; a solid state SCR switch would be used to turn on or off the power to the induction coil. Voltage adjusting transformers and capacitors are used to correct the induction coil power factor to better than an 80% lag. The power is then conveyed through a busy system to the induction coil.

Frequency plays an important role in the depth of penetration into the stream of scrap metal pieces. 60 cycle power source will have about a 2–4 inch penetration, higher frequencies such as 10,000 cycles per second will have a lesser depth of penetration (possibly only about 0.05 inches) which is satisfactory for smaller size particles. A power supply of 25 cycles will have a penetration to as much as 5 inches.

To implement this, as shown in FIG. 5, one or more resistance coils 43 are helically wound around the conduit 34 entraining the stream of scrap metal pieces. The conduit 34 should be formed of nonmagnetic stainless steel encased in a thin wall of refractory material separating the stainless steel from the resistance coils. The inductive coils 43 in turn should be separated by a slight air space 45 of about ¼ inch. The length 46 of the conduit along which inductive heating is applied, should be preferably about 8 feet with the stream of metal particles moving at a rate of about 160 inches per hour as determined and controlled by the feed through the hot compacting apparatus 47 of step 5. This will render a time dwell for each particle of scrap within such conduit to be no greater than 40 minutes. In lieu of the refractory encasement of the stainless steel wall, water cooling may be used to control the immediate localized heat buildup in the stainless steel wall while permitting radiant energy to pass therethrough.

As examples of inductive heating rate, the following is given:

| Smallest Dimension of Coil (in inches) | Furnace Length (in inches) | Total Cross-Section of Coil (in sq. inches) | Mean Density of Metal Strand thru Coil (in %) | Total Dwell of Metal Strand in Coil (in minutes) | Speed of Metal thru Coil (inches/ minute) |
| --- | --- | --- | --- | --- | --- |
| 7 | 21 | 150 | 15 | 40 | 2.6 |
| 7 | 15.9 | 112.5 | 20 | 40 | 2.6 |
| 7 | 12.73 | 90 | 25 | 40 | 2.6 |
| 7 | 10.6 | 75 | 30 | 40 | 2.6 |

To heat the core area 42 of the stream of metal particles to a temperature which is below an extrudable temperature but sufficient to be molded and yet act as a stiffer core support against which the outer peripheral zone 41 may be extruded, the combustion of fossil fuel is employed. To this end, nozzles 48 and 49 are employed to act as flame holders for a mixture of natural gas and $O_2$ passing therethrough. The combustion of fossil fuel is carried out to directly fire the stream of moving metal pieces by having flame torches 50 aimed slightly downwardly while impinging upon the outer surfaces of said stream 33 at a location in advance of the mouth 52 of the compacting station. Other torches 51 are aimed slightly upwardly at the exit of the apparatus 47.

Figure 15:
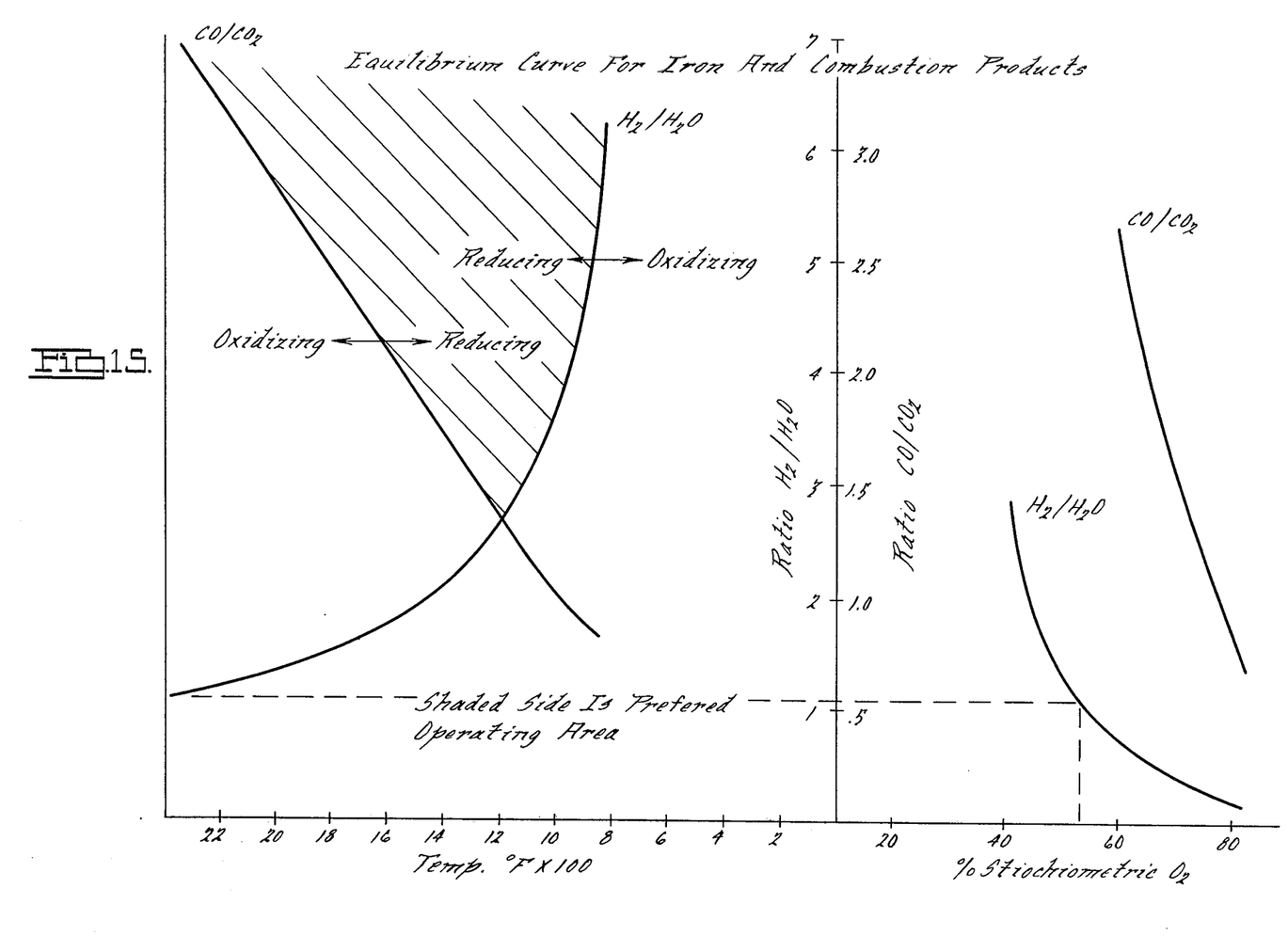
FIG. 15 is a composite graphical illustration of plotting temperature and % stoichiometric with oxidizing and reducing ratios.

Direct firing herein must create its own generated atmosphere. The self-generating atmosphere herein is of the type referred to as scaleless heating. The elimination of scale, of course, is traditionally very important since scale can cause many problems in rolling, forging and extrusion of steel in subsequent stages. The result of combusting natural gas with air or preferably with pure oxygen, will result in the production of $H_2$, $H_2O$, $CO$ and $CO_2$, plus a large quantity of $N_2$. The presence of hydrogen and water is an indication of an oxidizing condition and therefore an oxidizing atmosphere; the presence of CO and $CO_2$ is an indicator of a reducing atmosphere and therefore the reduction of iron oxide. It has been found that in order to achieve a sufficiently reducing atmosphere for purposes of this invention, that the natural gas must be burned with at least a 10% deficiency of air or oxygen, that is between 55 and 90% stoichiometric. The amount of nitrogen present does not affect the question of whether it is a reducing or oxidizing atmosphere. Of course, the ratio of whether the atmosphere is reducing or oxidizing will depend upon the temperature to which the steel particles are being heated. This variation is best depicted as shown in FIG. 15 whereby the shaded area represents the required ratio of $H_2/H_2O$ in comparison to $CO/CO_2$.

As preferably required of this invention, the core temperature should be at approximately a 65% differential from that of the outer surface. Thus, if the outer surface is being heated to 1800°, the core temperature, at its coldest condition, will be about 1400° F. To achieve a highly reducing atmosphere at 1400° F approximately a 70% stoichiometric ratio must be maintained.

The efficiency of this combination or dual heating is characterized quantitatively by a heat requirement per ton of heated metal product to be 1,400,000 BTU/ton, assuming the end product to have a 5×5 inch section at 90% density and the inductive heating is carried at 60 cycles/sec. This compares favorably to other systems, such as conventional natural gas or oil reheating in a soaking pit requiring 1,500,000 BTU/ton combined with a conventional electric furnace requiring 1,878,250 BTU/ton, the conventional combination requiring greater requirements than for the combination taught herein. This improvement in efficiency is due to the use of fossil fuel combustion as primarily an atmosphere generator and the use of inductive energy to heat the outer peripheral region only to a plastic weldable condition. But the fossil fuel combustion does contribute to heating as a by-product, as much as 15%; the heated refractory or conduit reradiates heat to the metal strand to supply an additional boost.

Hot molding and/or extrusion to provide an encapsulated strand comprises essentially kneading the outer zone 41 of the heated stream of hot metal at a stationary region through which the stream must pass, the kneading is carried out so as to effect densification of the outer peripheral zone 41 of the stream to 100% density and thereby provide an impervious oxidation-proof shell or encapsulation of a minimum of ¼ inch thick. The kneading is carried out in such a manner that the outer peripheral zone 41 is hot worked utilizing the slightly colder but yet readily moldable core 42 to act as an anvil in conjunction with the compacting dies 55 and 56 to extrude the outer peripheral zone. The inner core, in effect, is molded as opposed to the function of extrusion for the outer peripheral zone. Nonetheless, the two operations of molding and extrusion together constitute what is known herein as hot encapsulating compaction under this step.

Figure 6:
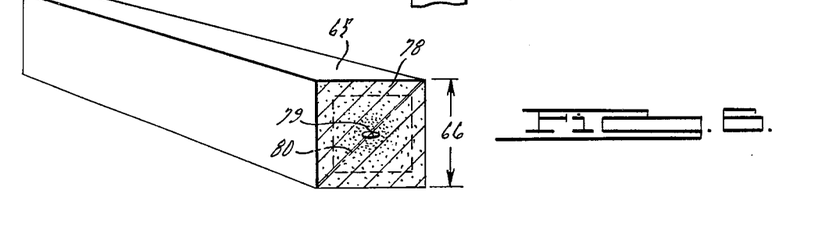
FIG. 6 is an enlarged perspective sectional view of the product produced by the process of FIG. 1.
Figure 10:
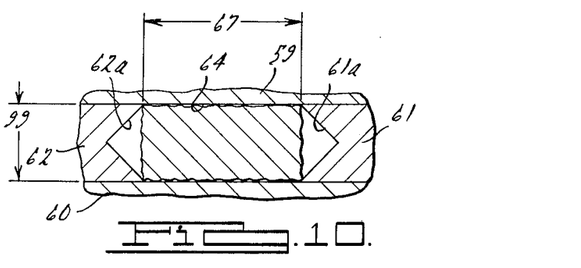
FIGS. 10-13 represent schematically different phases of hot compacting of a selected section of the stream.

A preferred apparatus for carrying out this dual type of extrusion and molding, is shown in the lower portion of FIG. 5. The hot compaction mill or apparatus 47 consists of a graduated compacting zone 58 defined by two opposed jaws 55 and 56 and two opposed side walls 59 and 60; the dies carry plattens 61 and 62 each eccentrically actuated to have a compound movement so that their action is equivalent to a duck-bill action; such action operates more gently on the incoming portion 33a of the stream 33 and acts more severely on the trailing portion 33b of the stream as it exits from the mill to constitute said encapsulated strand 63. The plattens 61 and 62 are actuated in close conformity with a slot or space 64 defined by the two fixed side walls or anvils 59 and 60. Each of the plattens have an interior surface (61a and 62a respectively) shaped as shown in FIG. 10. The included angle is preferably shown as 90° and the faces of each movable platten are of generally equal length to form a square sectioned billet as illustrated in FIG. 6. The spacing 99 between the fixed side walls is designed to be substantially equivalent to the diagonal dimension 80 of the resulting product 65 (see FIG. 6). The other initial spacing 67 between the mouth of the plattens represents the uncompacted long dimension of the stream of pieces as they enter. FIG. 14 is an alternative arrangement for making slabs; the stream section has the longest dimension 99 side ways. The resulting encapsulated product may have a height equal to the billet of FIG. 13, but its width will be substantially greater.

The plattens are eccentrically actuated by having an offset distance 69 between the center of movement of the actuating shaft 70 and the center of the opening 71 within which the shaft moves or planetates. Such distance represents the throw or eccentric movement of the plattens. This can be varied with various design considerations in mind. To assure that the working surface of the platten will undergo a prescribed duck-bill motion, cylindrical constraints 72 and 73 are employed in line with the upper and lower mass centers of the compacting jaws or dies. The upper cylindrical constraints 72 are effective to roll between a fixed horizontal surface 74 and the generally horizontal surface 75 of the die; the lower cylindrical constraint 73 is resiliently biased by a suitable spring or suspension mechanism 76 which will urge the jaw or die into tight relationship with the constraint 72. Both cylindrical constraints 72 and 73 are free to move relative to the surfaces against which they bear.

The vertical or transverse throw of any point on the working surface of the platten can be adjusted by relating the point at which the constraint bears upon the jaws as well as the degree of eccentric throw. Similarly the vertical component movement of any vertical point on the platten surface can be adjusted to give a desired feed rate of the stream by relating the same constraints and eccentric throw. Pull rolls 97 are employed downstream of the apparatus 47 to assist gravity to move the metal strand through the mill.

The typical length 77 of such a platten will be approximately 40 , and the normal eccentric throw 69, to achieve a reduction of a stream section of 112.5 square inches to a resulting product section of 25 square inches, will be about 1½ inches. The diameter of such cylindrical constraints 72 and 73 are generally about 6 inches on center the resulting encapsulated metal strand is closed at a leading face 86 by means of a shear 85, which by the act of shearing densifies the lead face 86. Similarly a trailing face 7 is formed to close the trailing end of a cut strand as a result of the next shearing.

Figure 11:
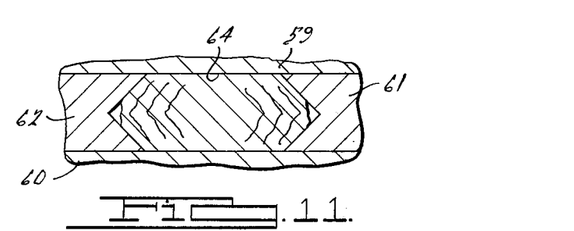
Figure 12:
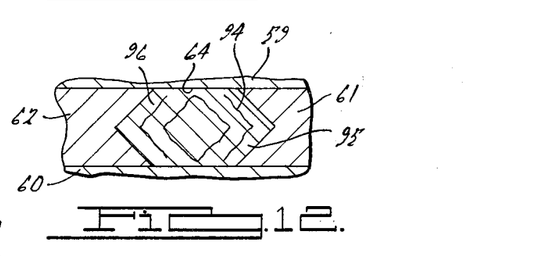
Figure 13:
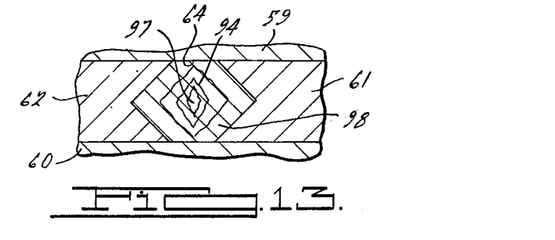
Figure 14:
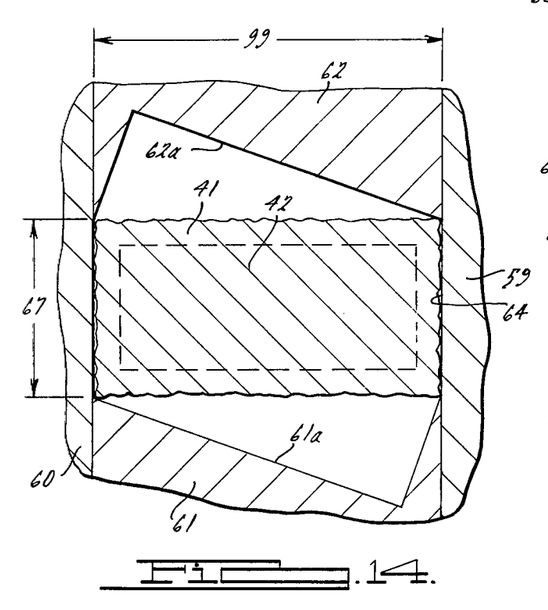
FIG. 14 is an enlarged view similar to FIG. 10 but for an alternative arrangement.

Turning to FIGS. 10 to 13, the sequence of illustrations show the general influence of the compacting plattens on the outer high temperature zone 41 while the inner cold zone 42 acts as a back-up anvil but still undergoes some degree of molding. The surface interface between the fixed and movable platten and the outer surface of the heated stream is total but the greatest kneading action is impacted by the movable plattens. The fixed anvils or plattens impart an extruding or constraining force which assists hot encapsulating compaction and works the outer surface of the stream. As the V-shaped movable plattens 61 and 62 are moved progressively closer together, such as in the stage of FIG. 12, the outer surface regions 95 and 96 worked by each of the respective plattens begin to merge to form a continuous outer fully dense peripheral margin. Lines or planes of metal working are shown at 94. The complete encapsulation 98 of the less than fully dense core is shown in FIG. 13. The shell is defined herein as impervious which means that air is extremely retarded in penetration. The core density in the resulting product 65 may vary considerably depending on the degree of hot compaction, but can typically be in the range of 50 to 60% density (meaning with respect to full density or solid. In some cases the core may contain a void 97 at the center of the resulting product. For illustration, a final resulting product section of about 5 by 5 inches is desired; the diagonal dimension 80 must be calculated (here determined to be 7.08 inches). Utilizing this diagonal dimension, the entering stream of particulate particles must be arranged to have a lateral dimension 81 of about 7.08 inches and the longitudinal dimension 82 can be about 20 inches. Assuming the stream density is approximately 20%, at each ¼ phase working within the hot compaction mill, the longitudinal length of the stream will be reduced progressively from 16 inches to 12.8 inches to 9.4 inches, to 6.35 inches and finally to 25 inches and at least at a 100% density in the outer regions. The density will vary progressively from the center at about 20% to 25%, then to 33%, then 50% and finally in excess of 100% in the outer peripheral region. The following data is helpful to illustrate the variance of density at a typical rate through hot encapsulating compaction to make a 5×5 inch section end product:

| Patent Figure Reference | Stream Section Area | Density % | | | Rate | |
|---|---|---|---|---|---|---|
| | | at Surface | Mean | at Core | in. per min. | in. per sec. |
| FIG. 10 | 112.5 | 20 | 20 | 20 | 2.6 | .045 |
| FIG. 11 | 100 | 60 | 23 | 20 | 2.6 | .045 |
| FIG. 12 | 50 | 90 | 45 | 30 | 2.6 | .045 |
| FIG. 13 | 25 | 100 | 90 | 60 | 2.6 | .045 |

Contrary to the prior art, it is desirable that the application of compacting forces achieve welding of the outer peripheral margin at low speed and at low impaction rates so as to permit the outer region to be slowly extruded. There is no concern that the impaction forces of the plattens will be dissipated through the less dense core material. Since the stream of material is maintained at a differential temperature level between the outer surface and the core; the inner core will act as an anvil against which the outer surface may be worked. In order to permit such extrusion to take place, the rate of strain should be less than 7 seconds and preferably less than 4 seconds.

V-shaped interior faces of the platten are used for making a billet or bloom useful in a bar mill. However, such V-shaped concept can also be used on plattens for making a slab useful in a strip rolling mill (see alternate embodiment of FIG. 14).

It is also within the scope of this invention to process previously compacted cubicles 102 (see FIG. 16) which have mating male elements 100 and female elements 101 effective to permit the cubicles to be interfitted for forming a column. The column is then heated and processed according to the steps 4, 5 and 6 herein. The cubicles are defined herein to be encompassed within the term regularized particles. The length 104 of the male element (length 103 of the female element should equivocate about 1/3-1/2 the length 105 of the cubicle and generally equal to the width 106. The surface of the male element will not be heated to a plastic condition such as will be true for the female element. This facilitates welding during encapsulation.

It is additionally within the scope of this invention to process the heated stream to an encapsulated product having any selected mean interior density and also a less than fully dense outer encapsulation if the end product can be used with tolerance of possible oxidation.

I claim as my invention:

1. A method of making a reconstituted coherent metal strand, comprising:
   a. converting a supply of scrap metal to regularized particles,
   b. continuously feeding said regularized particles through a desired aperture to form a moving stream of particles of predetermined volume and uniform cross-section,
   c. while entraining said stream of particles, differentially heating the latter so that the temperature of the particles in an outer peripheral zone of said stream are at a temperature assuring extrusion and welding between adjacent particles under pressure, while the particles in a central core of said stream are at a temperature inhibiting welding but permitting molding, said differential heating being carried out by the use of electrical induction energy to heat the peripheral zone to said high temperature, the penetration of said inductive energy limiting the degree to which heating can be carried out effectively within the core section of said stream,
   d. immediately and continuously passing said heated stream between compacting dies, certain of said dies being pulsated to form of said stream a composite self-supporting strand having an end, with the particles in said outer peripheral zone forming an impervious encapsulating shell, and
   e. sealing said end of said strand against oxidation to provide a product in which the longitudinally extending central core of said strand, other than said outer peripheral zone is less than 90% fully dense.

2. The method as in claim 1, in which said stream and strand are each generally vertically oriented.

3. The method as in claim 1, in which a pulling force is applied to said self-supporting strand downstream of said pulsating dies to assist in the travel of both said stream and strand through said respective aperture and dies.

4. The method of claim 1, in which said differential heating is carried out by the use of electrical induction energy at a frequency between 15-60 cycles/second.

5. The method of claim 1, in which the temperature to which said particles are heated in the outer peripheral zone is in the range of 1600°-2300° F.

6. The method of claim 1, in which said stream of particles is subjected to a protective atmosphere to prevent oxidation during heating and compacting.

7. The method as in claim 1, in which said strand is heated by electrical inductive energy at a rate sufficient to avoid precipitation of detremental magnesium oxide upon cooling.

8. The method as in claim 1, in which said heating is carried out under a protective or reducing atmosphere, the strand being arranged to receive the heated gaseous flow of combustion products.

9. The method as in claim 1, in which said scrap metal has an oxide content no greater than 2% and said chips are configured to have a dimension no greater than four inches to promote density to 18-20% of full solid in said stream.

10. The method as in claim 1, in which said particles are force-fed, during said continuous feeding, said scrap metal is subjected to at least one of an anti-hay-stacking mechanism and vibration, so as to promote free flowing and nesting of said scrap metal pieces and to promote a density between 20-25% of full solid in said stream.

11. A method of making a reconstituted self-supporting metal strand, comprising:
   a. providing a feeding die through which a charge of comminuted scrap metal is to be passed and providing a pulsating compacting die apparatus through which the heated charge of comminuted scrap metal is to be passed,
   b. comminuting a supply of scrap metal to regularized particles each having the greatest dimension thereof no greater than ½ the smallest dimension across said feeding die, c. continuously gathering the force-feeding said regularized particles through said feeding die to form a moving non-adherent stream, d. electrically inductively heating said non-adherent stream to a temperature at which at least the particles in a predetermined outer zone thereof can be solidified under a pressure no greater than 7500 psi, e. immediately passing said non-adherent stream through said pulsating compacting apparatus to form a composite self-supporting strand with the particles in said outer zone forming an impervious encapsulating shell along its longitudinal length about a longitudinally extending central core that remains less than 90% fully dense, f. applying a pulling force on said self-supporting strand to assist in the travel of said non-adherent and self-supporting strand and thereby maintain continuity therebetween as well as rate of movement, and g. sealing the ends of said strand or sections thereof to make a complete encapsulation about all of said surfaces of the strand.

12. The method as in claim 11, in which said scrap metal is selected as sheet stock and said comminuting step comprises cutting said scrap metal to generally uniform chips, each chip being given at least one dimple to promote free flowing while in said stream.

* * * * *